May 27, 1969     E. M. JOST     3,446,675

ELECTROCHEMICAL POWER SUPPLY

Filed March 18, 1966

Ernest M. Jost,
Inventor.
Koenig, Senniger, Powers and Leavitt,
Attorneys.

United States Patent Office 3,446,675
Patented May 27, 1969

3,446,675
ELECTROCHEMICAL POWER SUPPLY
Ernest M. Jost, Plainville, Mass., assignor to Texas Instruments Incorporated, Dallas, Tex., a corporation of Delaware
Filed Mar. 18, 1966, Ser. No. 535,452
Int. Cl. H01m 27/22, 29/02
U.S. Cl. 136—86                                13 Claims

ABSTRACT OF THE DISCLOSURE

A rechargeable high energy density electrochemical power supply having an electrically conductive cathode, a body of an aqueous electrolyte, and an electrically conductive porous anode. The total projected area of the anode in contact with the electrolyte is at least equal to the total projected area of the cathode in contact with the electrolyte. The total developed area of the anode in contact with the electrolyte is at least approximately ten times that of the cathode in contact with the electrolyte.

---

This invention relates to power supplies and more particularly to rechargeable high energy density electrochemical power supply cells.

Among the several objects of the invention may be noted the provision of such cells which are compact in size and have high energy density (at least approximately 50 watt hours/lb.) on a volume, weight and cell basis and will operate at high current densities; the provision of power supplies of the type described which have low internal resistances and are capable of high discharge rates; the provision of power supply cells which will operate effectively over a wide range of temperatures, and in which explosion hazards are eliminated; the provision of such power supplies which are efficient in terms of the ratio of discharge energy to charging energy and are capable of many cycles of operation; the provision of power supplies of the type described which are unharmed by high rates of charge or discharge, or by long periods of standing in a charged or uncharged condition; and the provision of power supplies which are physically rugged, portable and utilize inexpensive materials and construction. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a schematic drawing of a power supply of the present invention;

Corresponding reference characters indicate corresponding parts throughout the several views of the drawings.

Figure 1:
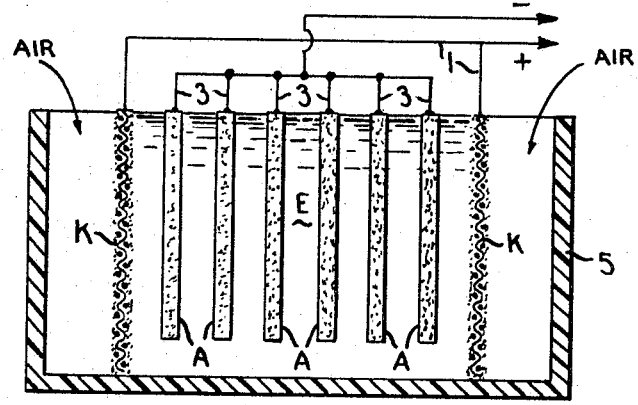

Present day conventional electrochemical cell power supply technology emphasizes the selection of electrode materials on an energy density-minimum weight basis and substantially matching the anode and cathode electrodes in the geometrical and numerical senses. The present invention represents a marked departure from these generally accepted conventional concepts by emphasizing energy density-volumetric considerations in the selection of anode materials; in utilizing as a cathode an air electrode; in having the total projected area of the anode in contact with the electrolyte at least equal, and preferably several times as great as the total projected area of the cathode contacting the electrolyte; and in having the total developed area of the anode in contact with the electrolyte at least approximatly ten times, and preferably many times (e.g. 100,000 or more) that of the cathode in contact with the electrolyte. The term projected area means the total superficial or extrinsic area of electrode contacted by the electrolyte disregarding the exterior and interior characteristics of the porous electrode structures. The expression total developed area refers to the total active or intrinsic area of electrode contacted by the electrolyte taking the porous nature of the electrode structure into consideration. In a conventional cell the total projected area of the anode is substantially equal to that of the cathode, and the total developed area of one electrode is at best only a few times greater than that of the other electrode. In the present invention the stored electrochemical capacity of the anode is many times greater than that of the cathode, again in sharp contrast with conventional cells in which the stored electrochemical capacities of the anode and cathode are substantially of the same order.

Briefly, the invention in its broader aspects relates to rechargeable electrochemical power supplies which have a high energy density. In accordance with this invention power supplies having such high energy densities (viz., at least 50 watt hours/lb. and as much as 150–300 to about 500 watt hours/lb.) comprise an electrically conductive cathode, a body of aqueous electrolyte and an electrically conductive porous anode immersed in the electrolyte. The anode comprises a metal which has a solubility less than that of zinc in an alkaline electrolyte during electrochemical action, and has an electrochemical potential (relative to a standard hydrogen electrode) less negative or more noble than that of zinc in an alkaline electrolyte. The cathode has a surface in electrolytic contact with the electrolyte and is permeable to the passage of air and oxygen therethrough, but is substantially impermeable to the passage of the electrolyte. The total projected area of the anode in contact with the electrolyte is at least equal to the total projected area of the cathode in contact with the electrolyte, and preferably the total projected anode area is at least twice as great as that of the cathode. The total developed area of the anode in contact with the electrolyte is at least approximately ten times, and preferably up to one hundred thousand or more times, that of the cathode in contact with the electrolyte.

More specifically the novel electrochemical power supply systems of this invention employ metal-air couples or cells in which the cathodes, or positive polarity electrodes, are microporous or permeable to air and oxygen but not to aqueous alkaline or acid electrolytes. These air electrodes or cathodes are quite thin, preferably in the order of 5–25 mils. Exemplary useful air electrodes are disclosed, for example, by Niedrach and Alford in the Journal of the Electrochemical Society (February 1965, p. 117 et seq.) and such electrodes used in fuel cells are commercially available. These air electrodes have a capacity which is practically infinite, i.e., the capacity of a cell using such a cathode can be increased by increasing the available anode material in contact with the electrolyte and providing sufficient oxygen at the cathode, such as by a forced air supply.

The anode, also referred to herein as the counterelectrode or counterelectrodes, is therefore the principal significant limiting factor in increasing the capacity of these power supply cells. If conventional practice in battery technology were followed and the facing or total projected areas and developed areas of the anode and cathode were made substantially the same, the capacity of such a cell would not be fully realized. To increase the surface area of the anode or counterelectrode by increasing the thickness of a porous anode has distinct limitations due to concentration polarization and the rate of diffusion of the conducting ions in and out of the counterelectrode. It is preferred to keep the diffusion paths quite small and the maximum thickness of the counterelectrode in the order of about 100 mils and preferably about 50 mils. Thus the anode of the cells or couples of the present invention is preferably comprised of two or more counterelectrodes each of which has a projected area in contact with the electrolyte which is at least equal to the electrolyte-contacting area of the air cathode and a developed area which is many times greater than that of the cathode. To further increase the capacity of these electrochemical power supplies, the electrolyte may be force-circulated through the unit to improve the mass transport.

The metals useful as anodes or counterelectrodes of this invention not only have high volumetric energy density characteristics, but also possess desirable characteristics relative to solubility and corrosion factors in an aqueous electrolyte. Zinc, for example, is not suitable from these aspects nor is any metal which has a solubility in the aqueous electrolyte which is not less than that of zinc. Also, metals which have EMF's less negative than that of zinc (approximately $-1.25$ v. in an alkaline electrolyte relative to a standard hydrogen electrode), but more negative than approximately 0.5 v., are not satisfactory because of their corrosion propensities during electrochemical reaction wherein a portion of the coulombic efficiency is lost in chemical corrosion reactions rather than in a power producing electron exchange reaction. In accordance with this invention the power supply anodes of this invention include cadmium, cobalt, iron, vanadium, chromium and tungsten. These anodes are porous and may include an electrically conductive grid or mesh of an inactive metal, such as nickel, supporting the active anode material, or these anodes may be self-supporting.

The electrolyte may either be an aqueous alkaline or acidic solution having a concentration of between about 5%–50% by weight and preferably about 20–30%. Examples of alkaline electrolyte include alkali hydroxides such as potassium, sodium and lithium hydroxides, while exemplary acidic electrolytes include sulphric, phosphoric, nitric and hydrochloric acids.

The rechargeable power supplies of this invention produce electrical energy by electrochemical reactions involving, during discharge of the cell, a molecular dissociation wherein anode metal ions (i.e., cations) are formed at the anode or counterelectrode-electrolyte interfaces and migrate through the electrolyte toward the cathode-electrolyte interface with free electrons being produced at the anode terminal. Concurrently, the oxygen molecules supplied from air or oxygen diffusing through the air permeable cathode are reduced to hydroxyl ions which migrate toward the anode, free electrons being supplied through an electrically conductive external load circuit by electric current flow from cathode to anode. During discharge metal hydroxide is formed at the anode and water is simultaneously being formed at the cathode with the concurrent consumption of oxygen at the cathode. During charging the anode metal is formed for redeposit on the anode and oxygen is produced at the cathode. The oxidation reaction at the anode is represented by:

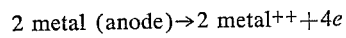
2 metal (anode) → 2 metal$^{++}$ + 4$e$ while the reduction reaction at the cathode is:

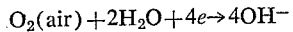
$O_2$(air) + 2$H_2O$ + 4$e$ → 4$OH^-$

The overall charge and discharge reaction of the cell is:

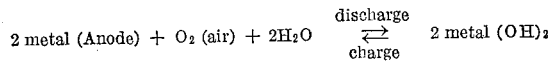
$$2 \text{ metal (Anode)} + O_2 \text{ (air)} + 2H_2O \underset{\text{charge}}{\overset{\text{discharge}}{\rightleftarrows}} 2 \text{ metal } (OH)_2$$

It will be noted that the reaction at the cathode during discharge involves reduction of each molecule of oxygen to four hydroxyl ions and the utilization of all four electrons, rather than the partial reduction of oxygen molecules to perhydroxyl ions wherein the $O_2$ bond is not split and which involves the utilizing of only two of the four available oxygen electrons. The latter reaction, therefore, utilizes only one-half the possible coulombic efficiency while the former utilizes substantially the entire coulombic efficiency. This hydroxyl mechanism at the cathodes of these novel electrochemical power supplies is effected by the presence of a catalyst at the cathode-electrolyte interface which promotes or utilizes the full use of oxygen, i.e., the reduction of oxygen to hydroxyl. Such catalysts are of the platinum type, viz, platinum black particles which are supported on thin screens or grids of inactive metal bonded and waterproofed with a synthetic resin (e.g., tetrafluoroethylene polymers or other useful polymeric synthetic resin materials such as polyethylene, polypropylene, polystyrene, polyacrylonitrile and polyvinylchloride) air or oxygen-permeable membrane which is substantially impermeable to the aqueous electrolyte. The Faraday or coulombic efficiency of these power supply units is quite high. For example, a cell of the present invention will have a coulombic efficiency of at least 60–70% or more when discharged in an hour or less from a fully charged condition, i.e., at least 60–70% of the anode metal will be utilized to produce electrical energy electrochemically when the cell is discharged from full charged capacity in one hour or less. The catalyst material may be extended by use of certain other finely divided material such as boron and/or titanium carbides.

Referring now more particularly to the drawings, an exemplary rechargeable power supply of the present invention is illustrated in FIG. 1 in which an air breathing cathode structure is indicated at reference character K. As described above, this electrode comprises a platinum black catalyst supported in a synthetic resin membrane (air permeable-aqueous electrolyte impermeable) bonded to a fine mesh screen of a metal such as nickel or tantalum. Typically the electrode constituting cathode K is about 6–7 mils in thickness and carries 5–10 grams of platinum black per square foot. Electrically conductive straps 1 are connected to the supporting mesh and interconnected to form the positive terminal of this electromechanical power supply. The anode of this power supply embodiment is constituted by six spaced apart parallel counterelectrodes A. Each of these includes a supporting fine mesh metal screen or grid carrying a porous body of an anode metal described above. Commonly connected electrically conductive straps 3 are connected to the supporting mesh of each of the counterelectrodes A and provide a negative terminal for this unit. These electrodes A are immersed in an aqueous electrolyte E, the entire power supply being mounted within an insulating container 5. It will be noted that the cathode-facing area, or total projected area, of the anode in this unit is about six times the anode-facing or total projected area of the cathode. Also, the cell is supplied with air, as indicated, either from the ambient atmosphere or it may be provided at a pressure greater than atmospheric by a blower or fan system preferably powered by the cell unit itself.

Figure 2:
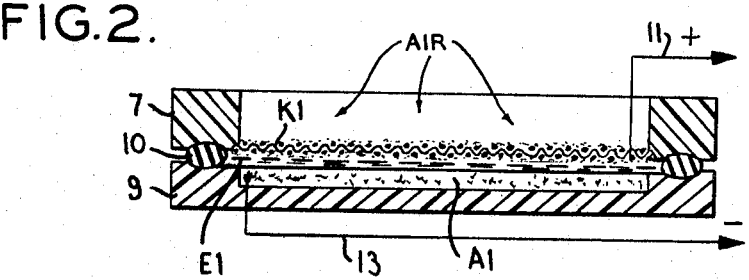
FIG. 2 illustrates another power supply embodiment of this invention.

FIG. 2 illustrates another power supply unit of the present invention comprising upper and lower insulated container members 7 and 9 clamped together and sealed relative to each other by means of a resilient O ring 10 positioned between the opposing faces of the members. Applied to the inner and lower edge of member 7 is an air-breathing cathode K1 and an anode A1 is secured to the lower member 9. Terminal leads 11 and 13 are provided for the cathode and anode respectively. A body of electrolyte E1 is maintained in the space between the opposing surfaces of cathode K1 and anode A1 and in electrolytic contact therewith.

An exemplary anode A1 for the power supply of FIG. 2 is made by electroplating cadmium on a thin grid of expanded nickel mesh (approximately 7 mils thick) weighing approximately 250 mg./sq. in. from an aqueous solution of cadmium nitrate, $Cd(NO_3)_2 \cdot 4H_2O$, of a concentration of 350 g. of the nitrate in 150 ml. of water. The mesh having a projected area of 3.4 sq. in. was plated with a current of 850 ma. for two hours, which corresponds to an apparent current density of 250 ma./sq. in. The plating cell cadmium electrodes totaled 16 square inches. After washing away the basic cadmium nitrate, the plated mesh had gained 3.554 g. as compared to the unplated mesh weight of 0.848 g. The thickness of this anode A1 was approximately 20 mils and was positioned in the cell assembly as illustrated in FIG. 2.

The air electrode or cathode K1 of substantially the same area and weighing 1,490 grams was positioned as illustrated in FIG. 2, with the spacing between opposing electrode surfaces being about 10 mils. Thus an electrode was constituted by fine nickel mesh carrying about 7–10 mg. of platinum black/sq. cm. suspended in a carbon-Teflon matrix bonded to the mesh and having a thickness of approximately 4–8 mils.

The electrolyte E1 was a 30% solution of potassium hydroxide (approximately 7 N) and weighed 1.410 g.

This cell delivered 1.05 to 1.15 amp. hr. at a current density of 300 ma./sq. in. (i.e., at a discharge current of 1000 ma.); the discharge periods being approximately one hour and six minutes and one hour and nine minutes, respectively. This cell was repeatedly charged and discharged with the results remaining the same within 5%. The coulombic efficiency of this discharge was between 68% and 88% (depending on whether the anode weight gain of 3.554 g. is attributable to cadmium metal or its hydroxide). Experience has shown that the type of plating employed in forming the anode results in deposits which contain some cadmium hydroxide, but it can be stated that the efficiency was above 70%. The discharge voltage at the above current density was 0.865 v. Based on the above electrode and electrolyte parameters and excluding the fixture or container weight, the energy densities of this power supply were 60 watt hours/lb. and (assuming a total thickness of 40 mils for the cell) 7 watt hours/cu. in.

Another example of the power supplies of this invention utilizes a cobalt anode plated in a fashion similar to that described above, but electroplating approximately .31 sq. in. of expanded nickel mesh from an aqueous solution of cobalt nitrate rather than cadmium nitrate at approximately the same current density. The supporting expanded nickel mesh weighed approximately 77 mg. and carried 240 mg. of cobalt metal. An air electrode K1 of the same type but weighing 136 mg. was coupled to the porous cobalt anode and 128 mg. of 30% KOH was employed as the electrolyte. This cell was discharged at a current of 500 ma. which corresponds to a current density of 1.6 amp./sq. in. for nineteen minutes, the average voltage being 0.75 v. This corresponds to a 0.16 amp. hour capacity and the coulombic efficiency of discharge was in the order of about 70%. Based on the above electrolyte and electrode parameters the energy densities of this cell were 98 watt hours/lb. and 15.1 watt hours/cu. in.

Based on the above energy densities and the optimizing of the counterelectrodes, this represents an improvement of 4 to 7 times relative to present day rechargeable systems.

A still further example of power supply units of this invention was constructed of three parallel-connected cadmium electrodes made as described above and with an air cathode of the type described previously. The projected area of each cadmium electrode was 3.26 sq. in. while the weight and thickness were each respectively 4 g. and approximately .030 in. The combined weights of the three counterelectrodes or anodes in the discharged state, i.e., based on cadmium in the form of its hydroxide, was 12.5 g. The air electrode had a weight of 0.75 g. and a projected area of 1.63 sq. in. The electrolyte was 1.9 g. of 30% solution of potassium hydroxide, and the gap or spacing between the cathode and the anode was 10 mils. A polyamide or nylon porous nonwoven separator of about 7–10 mils in thickness was positioned between the cathode and opposing anode. Thus the total weight of counterelectrodes, electrolyte and air electrode was 15.15 g.

As the energy delivered from this electrochemical cell was 3.0 a.h. at a potential of 0.85 v., the watt hours was 2.55. The energy density was approximately 75 watt hours per pound. The efficiency approximated 65%, and this may be increased significantly with a greater porosity of the counterelectrodes, which was in the order of 40% in the charged state and 20% in the discharged state.

In this example the developed area of the cadmium electrode was 500 square meters which was 25 times larger than the developed area of the air electrode measured at 20 square meters.

Figure 3:
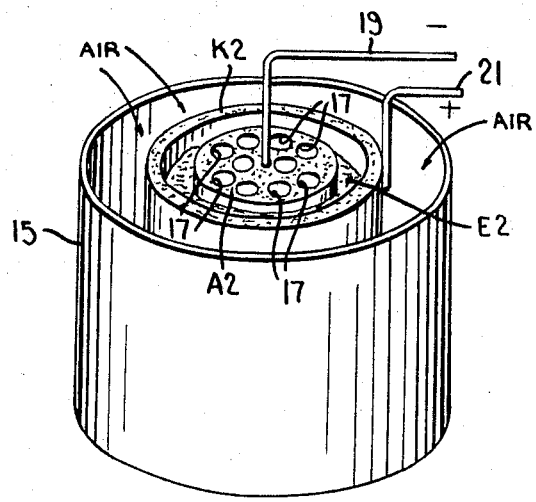
FIG. 3 shows still another power supply of this invention.

The power supply illustrated in FIG. 3 is still another embodiment of this invention, a tubular insulated casing or container being indicated at 15 and a tubular air electrode cathode K2 being spaced inwardly therefrom but coaxially aligned therewith. A porous counterelectrode structure or anode A2 is coaxially positioned within the tubular air electrode and includes a number of electrolyte passages 17 which are parallel the axes of the cylindrical anode. A body of electrolyte E2 substantially fills the interspace between cathode K2 and the outer surface of anode A2 as well as the passages 17 and the porous anode material between these passages. Terminal leads 19 and 21 are provided for the anode and cathode, respectively. Such a supply unit has a total projected anode or counterelectrode area that is many times greater than that of the cathode area in electrolytic contact with the electrolyte, and a total developed anode-cathode area ratio many, many times greater than the projected area ratio.

The size of the counterelectrode in such designs is limited in a practical sense by the maximum allowable current density at the air electrode or cathode since the latter would be operating at a considerably higher current density. It should be understood that the principles governing the shape, construction and arrangement of the anodes or counterelectrodes are similar to those governing the design of efficient heat exchangers and involve maximizing the total projected and developed area of the anodes in the minimum possible space. Thus numerous different designs are possible for meeting this criterion.

As an example of the significant utility of the power supplies of this invention, an air cathode-iron anode unit of approximately 100 cubic inches volume (a cube of approximately 4.6 inches per edge dimension) and weighing about eight pounds will power a typical lawnmower with a ¾ horsepower electric motor (equivalent to a 3 HP. gasoline piston engine) for two hours continuously (1120 watt hours). Thus, the power supplies of this invention may be utilized for inexpensive, compact light weight power supplies which may be repetitively discharged and recharged.

It will be understood that generally comparable power supplies may be made utilizing the other preferred anode materials disclosed above, viz., vanadium, chromium and tungsten. It will also be noted that where an alkaline electrolyte is employed (particularly with a forced air cathode supply) it may be desirable to use an air filter to remove carbon dioxide and thus avoid any carbonate contamination of the electrolyte by atmospheric carbon dioxide.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rechargeable high energy density electrochemical power supply comprising an electrically conductive cathode, a body of an aqueous electrolyte, and an electrically conductive porous anode, said anode being immersed in said electrolyte and comprising a metal which has a solubility less than that of zinc in an alkaline electrolyte during electrochemical action and an electrochemical potential less negative than that of zinc in an alkaline solution, said cathode having a surface in electrolytic contact with said electrolyte and being permeable to the passage of air and oxygen therethrough while being substantially impermeable to the passage of the electrolyte, the total projected area of the anode in contact with said electrolyte being at least equal to the total projected area of the cathode in contact with said electrolyte, the total developed area of the anode in contact with the electrolyte being at least approximately ten times that of the cathode in contact with the electrolyte.

2. A power supply as set forth in claim 1 in which the total projected area of the anode in contact with the electrolyte is at least twice as great as the total projected area of the cathode in contact with the electrolyte.

3. A power supply as set forth in claim 1 in which the anode comprises a metal selected from the group consisting of cadmium, cobalt, iron, vanadium, chromium and tungsten and the anode thickness is not substantially greater than approximately 100 mils.

4. A power supply as set forth in claim 3 in which the total projected area of the anode in contact with the electrolyte is at least twice as great as the total projected area of the cathode in contact with said electrolyte.

5. A power supply as set forth in claim 1 in which the cathode comprises a catalyst for reducing oxygen molecules to four hydroxyl ions and the thickness of said cathode is not substantially greater than approximately 25 mils.

6. A power supply as set forth in claim 5 in which the catalyst comprises a platinum type catalytic material.

7. A power supply as set forth in claim 3 in which the electrolyte is an aqueous alkaline electrolyte having a concentration by weight of between approximately 5% to 50%, and in which the cathode comprises a catalyst for reducing oxygen molecules to four hydroxyl ions.

8. A power supply as set forth in claim 1 in which air is supplied to said cathode at a pressure at least equal to ambient atmospheric pressure.

9. A power supply as set forth in claim 8 in which the electrolyte is force-circulated through said supply.

10. A rechargeable high energy density electrochemical power supply comprising an electrically conductive cathode, a body of an aqueous electrolyte, and an electrically conductive porous anode, said anode being immersed in said electrolyte and comprising a metal which has a solubility less than that of zinc in an alkaline electrolyte during electrochemical action and an electrochemical potential less negative than that of zinc in an alkaline solution, said cathode having a surface in electrolytic contact with said electrolyte and being permeable to the passage of air and oxygen therethrough while being substantially impermeable to the passage of the electrolyte, the total projected area of the anode in contact with said electrolyte being at least equal to the total projected area of the cathode in contact with said electrolyte, the total developed area of the anode in contact with the electrolyte being at least approximately ten times that of the cathode in contact with the electrolyte, said cathode being supplied with air at a pressure at least equal to ambient atmospheric pressure, said anode including a plurality of electrolyte carrying passages therethrough.

11. A rechargeable high energy density electrochemical power supply comprising an electrically conductive cathode, a body of an aqueous electrolyte, and an electrically conductive porous anode, said anode being immersed in said electrolyte and comprising a metal which has a solubility less than that of zinc in an alkaline electrolyte during electrochemical action and an electrochemical potential less negative than that of zinc in an alkaline solution, said cathode having a surface in electrolytic contact with said electrolyte and being permeable to the passage of air and oxygen therethrough while being substantially impermeable to the passage of the electrolyte, the total projected area of the anode in contact with said electrolyte being at least equal to the total projected area of the cathode in contact with said electrolyte, the total developed area of the anode in contact with the electrolyte being at least approximately ten times that of the cathode in contact with the electrolyte, said cathode being supplied with air at a pressure at least equal to ambient atmospheric pressure, said anode including a plurality of parallel electrolyte carrying passages therethrough, said anode being generally cylindrical in shape with the passages being parallel the axis of the cylinder, said cathode being tubular in shape and positioned to surround the anode and be coaxial therewith.

12. A rechargeable high energy density electrochemical power supply comprising an electrically conductive cathode, a body of an aqueous electrolyte, and an electrically conductive porous anode, said anode being immersed in said electrolyte and comprising a metal selected from the group consisting of cadmium, cobalt, iron, vanadium, chromium and tungsten and having a thickness not substantially greater than approximately 100 mils, said cathode having a surface in electrolytic contact with said electrolyte and being permeable to the passage of air and oxygen therethrough while being substantially impermeable to the passage of the electrolyte, said cathode comprising a catalyst for reducing oxygen molecules to four hydroxyl ions and having a thickness not substantially greater than approximately 25 mils, the total projected area of the anode in contact with said electrolyte being at least twice as great as the total projected area of the cathode in contact with said electrolyte, the total developed area of the anode in contact with the electrolyte being at least approximately ten times that of the cathode in contact with the electrolyte.

13. A power supply as set forth in claim 12 in which air is supplied to said cathode at a pressure at least equal to ambient atmospheric pressure.

References Cited

UNITED STATES PATENTS

| | | |
|---|---|---|
| 2,572,918 | 10/1951 | Fisher et al. |
| 3,043,898 | 7/1962 | Miller et al. |
| 3,228,798 | 1/1966 | Hart _____ 136—86 |

ALLEN B. CURTIS, *Primary Examiner.*